MULTIPLYING ARRANGEMENTS FOR DIGITAL COMPUTING MACHINES

Filed March 13, 1961 4 Sheets-Sheet 1

Inventors
Tom Kilburn
David Beverley George Edwards
David Aspinall
By Cushman, Darby & Cushman
Attorneys March 3, 1964 T. KILBURN ETAL 3,123,707

MULTIPLYING ARRANGEMENTS FOR DIGITAL COMPUTING MACHINES

Filed March 13, 1961 4 Sheets-Sheet 2

Inventors
Tom Kilburn
David Beverley George Edwards
David Aspinall
By Cushman, Darby & Cushman
Attorneys Inventors
Tom Kilburn
David Beverley George Edwards
David Aspinall
By Cushman, Darby & Cushman
Attorneys

MULTIPLYING ARRANGEMENTS FOR DIGITAL COMPUTING MACHINES

Filed March 13, 1961 4 Sheets-Sheet 4

Inventors
Tom Kilburn
David Beverley George Edwards
David Aspinall
By Cushman, Darby & Cushman
Attorneys United States Patent Office 3,123,707
Patented Mar. 3, 1964

3,123,707

MULTIPLYING ARRANGEMENTS FOR DIGITAL COMPUTING MACHINES

Tom Kilburn, Urmston, David Beverley George Edwards, Manchester, and David Aspinall, Cheadle, England, assignors, by mesne assignments, to International Business Machines Corporation, New York, N.Y., a corporation of New York Filed Mar. 13, 1961, Ser. No. 95,380
Claims priority, application Great Britain Mar. 18, 1960
10 Claims. (Cl. 235—164)

This invention relates to apparatus arrangements for effecting multiplication of numbers represented by electric signals and suitable for use in electronic binary digital computing and like devices.

In prior Patent No. 2,856,126 there is described a multiplier arrangement in which a series of successive partial products for addition to one another in accumulator means are obtained by multiplying one number, the multiplicand number, by the determined value of successive groups of digits of the other number, the multiplier number, instead of by the more usual method of forming the series of partial products by multiplying the first or multiplicand number by each single digit of the second or multiplier number in turn. This was effected by providing a plurality of signals each representing a different multiple of the multiplicand number and then selecting the appropriate one of these multiples for presentation to the number accumulating means, each successive selection being determined by the examined value of a different and successive group of the multiplier number digits. Thus, in a particular example, three successive binary digits of a binary multiplier number were examined as a group to determine the decimal number represented thereby and then appropriate selection was made by suitable switching means to select the appropriate one of a group of multiple versions of the binary multiplicand number consisting of the multiplicand, twice the multiplicand, three times the multiplicand and so on up to seven times the multiplicand.

The object of the present invention is to provide improved and simplified multiplier arrangements of the same general kind as that described above and in which the apparatus requirements for providing the different multiples of the multiplicand number are appreciably reduced and in which material saving in other ancillary apparatus requirements may be made.

In accordance with the invention, the multiplying arrangements include a signal-controlled arithmetic device which can be altered in its operation from an adding function to a subtracting function, means for providing a number of signals representing different successive multiples of the multiplicand number from the first up to half the total number of multiples capable of being signalled by the chosen number of digits forming each examined digit group in the multiplier number and means for effecting the selection, under the control of each of such multiplier digit signal groups in turn, of an appropriate one of the available signals representing multiples of the multiplicand number for application to one input of said adding/subtracting device and the simultaneous control of such adding/subtracting device by the same group of multiplier digits whereby it causes either addition or subtraction of the selected multiplicand multiple to or from a number signal applied to the other input.

In accordance with one form of the invention, the number signal applied to the other input of the adding/subtracting device is a signal representing a chosen multiple of the multiplicand number signal which lies approximately mid-way of the range of multiples which can be signalled by the chosen number of multiplier digits forming each examined group, the particular multiple selected for application to the first input of such adding/subtracting device and the add/subtract control being then so arranged that the output from said adding/subtracting device is a signal representing the correct partial product called for by the examined group of multiplier digits, such partial product signal being subsequently combined in an accumulating device with any previously obtained partial product number signal so as eventually to obtain an accumulated signal representing the required final product.

In accordance with a second and preferred form of the invention, however, the said adding/subtracting device is arranged to form part of the accumulating device itself with the signal representing the previously accumulated partial product signals applied to said other input of said adding/subtracting device, the selection of each new multiplicand multiple and the add/subtract control being effected in accordance with the examined values of each of the digits of each multiplier digit group and the value of the most significant digit of the previously examined multiplier digit group.

Thus, in one particular arrangement of the first form mentioned above and arranged to deal with the three binary multiplier signal digits as each examined group, the multiplicand multiples of *d*, 2*d*, 3*d* and 4*d* only need to be made available, the convertible adding/subtracting device being arranged to be supplied with the binary multiplicand multiple 3*d* at its other input and with an appropriately selected one of the available multiples at its first input coupled with appropriate simultaneous control of the add/subtract function of the device. Thus if the three multiplier digits signal the decimal value "4", the multiplicand in unaltered form, i.e. *d*, is selected and the convertible adding/subtracting device is caused to add; if the decimal value of the three multiplier digits is "0", the multiplicand multiple 3*d* is selected and the convertible adding/subtracting device is caused to subtract; if the decimal value of the three multiplier digits is seven, the multiplicand multiple 4*d* is selected and the convertible adding/subtracting device is caused to add and so on.

Alternatively, in a particular arrangement of the second and preferred form of the invention, again arranged to deal with three binary multiplier signal digits as each examined group, the same binary multiplicand multiples of *d*, 2*d*, 3*d* and 4*d* are made available but the selection from these and the add/subtract control is determined not only by the examined value of each three digit multiplier group but also in accordance with the examined value "0" or "1" of the most significant digit of the three multiplier digit group which controlled the previous selection and add or subtract operation and which was of lower significance than the currently operative group. Thus, if the examined three multiplier digit group is found to be 100 (decimal value 4) and the most significant digit of the previous multiplier digit group is value "0" then the selected multiplicand multiple is that of 4*d* and the adding/subtracting circuit is caused to subtract. If, however, with the same three digit group value 100, the previous most significant digit is of value "1", the selected multiplicand multiple is that of $3d$, the adding/subtracting circuit again being caused to subtract.

In order that the nature of the invention may be more readily understood, a number of simple embodiments thereof, as applied to both serial mode operation and parallel mode operation will now be described by way of illustrative example only and with reference to the accompanying drawings, in which:

FIGURE 3 is a block schematic diagram of an alternative arrangement also in accordance with the invention again utilising examination of 3-digit groups of the multiplier to control its operation and adapted for serial mode operation; while

Figure 1:
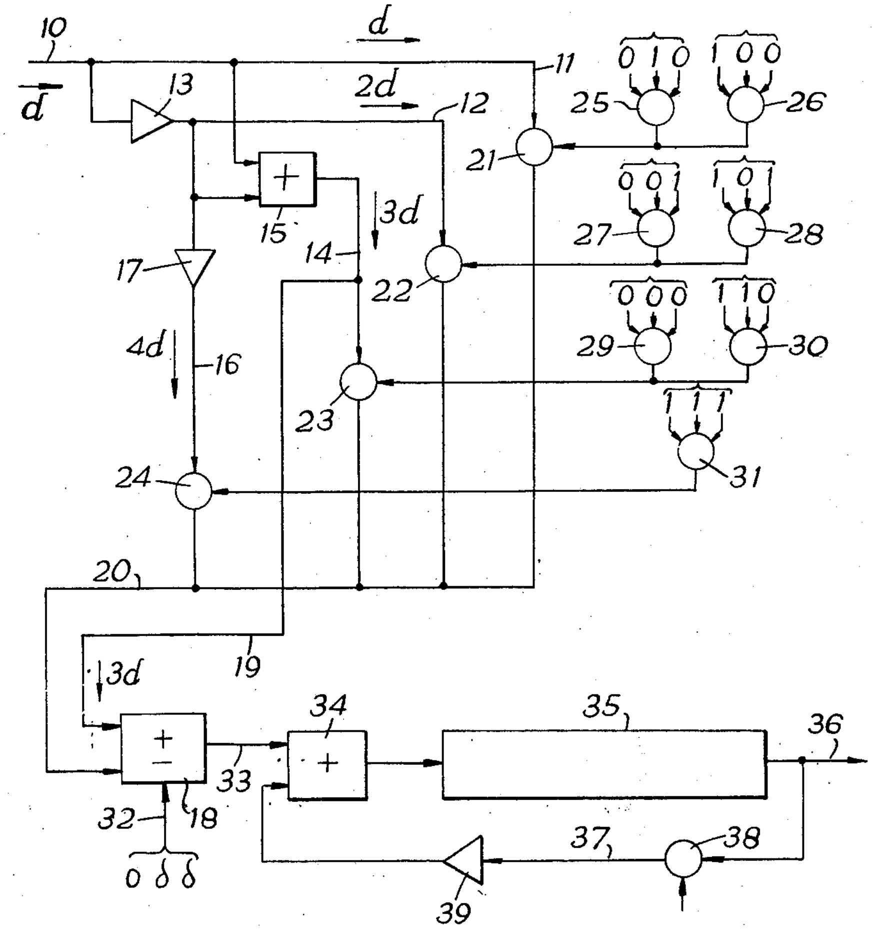
FIGURE 1 is a block schematic diagram of one arrangement in accordance with the invention suitable for serial mode operation with binary number signals and utilising examination of 3-digit groups of the multiplier number signal to control its operation.

Referring first to the serial mode arrangement of FIG. 1, the multiplicand number signal $d$ in the form of an electric pulse train is assumed to be made available on input busbar 10 at each of the successive operation cycles needed to form the series of partial products. This busbar 10 is connected directly by way of lead 11 to coincidence or AND gate 21 and by way of a delay circuit 13, which provides a delay time equal to one digit interval time of the multiplicand pulse train, and lead 12 to coincidence or AND gate 22. The output signals from delay 13, which represent the multiplicand multiple $2d$, are also applied as one input signal to an adding circuit 15, the other input signal to which is the multiplicand signal $d$ by way of a connection from the busbar 10. The output of this adding circuit, which represents the multiplicand multiple $3d$, is applied directly by way of lead 19 to one input of an arithmetical circuit device 18 which is arranged normally to cause addition of the number signals fed to its respective inputs but which can be altered to cause subtraction of the same input number signals by the application thereto of a suitable control signal on lead 32. The output signals from the adding circuit 15 (representing the multiplicand multiple $3d$) are also applied by way of lead 14 to the further coincidence or AND gate 23. The output signals from the delay 13 are additionally applied by way of further delay 17, also having a delay time equal to one digit interval of the multiplicand pulse train, to provide a signal representing the multiplicand multiple $4d$ and this is fed over lead 16 to coincidence or AND gate 24. The output lead of each of the gates 21, 22, 23 and 24 is connected to the second input lead 20 of the convertible adding/subtracting device 18. The output lead 33 from the latter carries the required partial product signal representing the multiplicand number multiplied by a three-digit group of the multiplier.

Each group of three successive multiplier digits is staticised in turn by means not shown but of conventional form and conveniently resembling those shown in the aforesaid prior patent, to provide, for each digit, separate "0" and "1" signals which are respectively at active level when the digit is of the "0" or "1". Such groups of staticised multiplier digit signals are applied in turn and in synchronism with an application of the multiplicant signal $d$ on lead 10 to each of a group of further coincidence or AND gates 25, 26, 27, 28, 29, 30 and 31 in the combinations indicated by the digit values beneath the respective bracket signs, the most significant digit being to the left in each case. Thus, the gate 25 will provide an output signal for the multiplier digit group 010 (decimal value 2) whereas the gate 26 will provide an output signal for the multiplier digit group 100 (decimal value 4), while the further gates 27, 28, 29, 30 and 31 provide output signals for the respective multiplier digit groups of decimal values 1, 5, 0, 6 and 7.

Gates 25, 26 have their outputs connected in parallel to control gate 21; gates 27 and 28 similarly provide control outputs for gate 22; gates 29 and 30 likewise provide control outputs to gate 23 while the output of gate 31 controls gate 24. The control signal for the add/subtract device 18 on lead 32 is likewise derived from the group of staticised multiplier digits, being caused to subtract whenever the most significant digit of the examined multiplier digit group is of value "0" and to add whenever such most significant digit is of value "1".

The gate circuits, such as those shown at 21, 22 . . . 31 can be of any convenient form already well known in the art as also can be the delay circuits 13 and 17 and the adding circuit 15. The controllable add or subtract device 18 may similarly be of any suitable form now well known in the art.

The manner of operation of this embodiment will be readily apparent from consideration of the following examples. If the examined multiplier digit group is 000 (decimal value 0) gate 29 will be operated to provide an output which will open gate 23 thereby admitting the multiplicand multiple $3d$ which is available from the adding circuit 15 to the second input 20 of the adding/subtracting device 18. The same multiplicand multiple $3d$ is always fed directly over lead 19 to the first input of such device 18. As the most significant digit of the examined multiplier digit group (000) is value "0," lead 32 will be energised to cause the add/subtract device 18 to subtract. The output on lead 33 is therefore $3d—3d$ or representative of the correct partial product, namely, zero. In the case of an examined multiplier digit group 101 (decimal value 5), gate 28 will be operated to provide an output to open gate 22, thereby releasing the multiplicand multiple $2d$ available from the delay 13 to the input lead 20 to the device 18. Since the most significant digit of the examined multiplier digit group (101) is now of value "1," the control lead 32 of the add/subtract device 18 is not provided with a control input and such device accordingly effects addition. The output on lead 32 is therefore $3d+2d=5d$ as is required.

The output lead 33 feeds the associated accumulator device utilised for adding together the various partial products as they become available one after the other during successive operation cycles during which the different multiplier digit groups are examined in turn. This accumulator device is shown as a further adding circuit 34 having one input supplied by lead 33, a shifting register or equivalent delay line 35 whose output lead 36 is connected to the second input of the adding circuit 34 by way of a regeneration loop circuit including a control gate 38 and a delay circuit 39 whose delay time is such that, during multiplication, the output signals on lead 36 arrive back at the input to the adding circuit 34 with a three digit place right shift relative to the timing of the signals of the next partial product which is to be added thereto and which is provided on lead 33 as a result of the next following operation cycle using the examination of the next following three digit group of the multiplier number signal.

Figure 2:
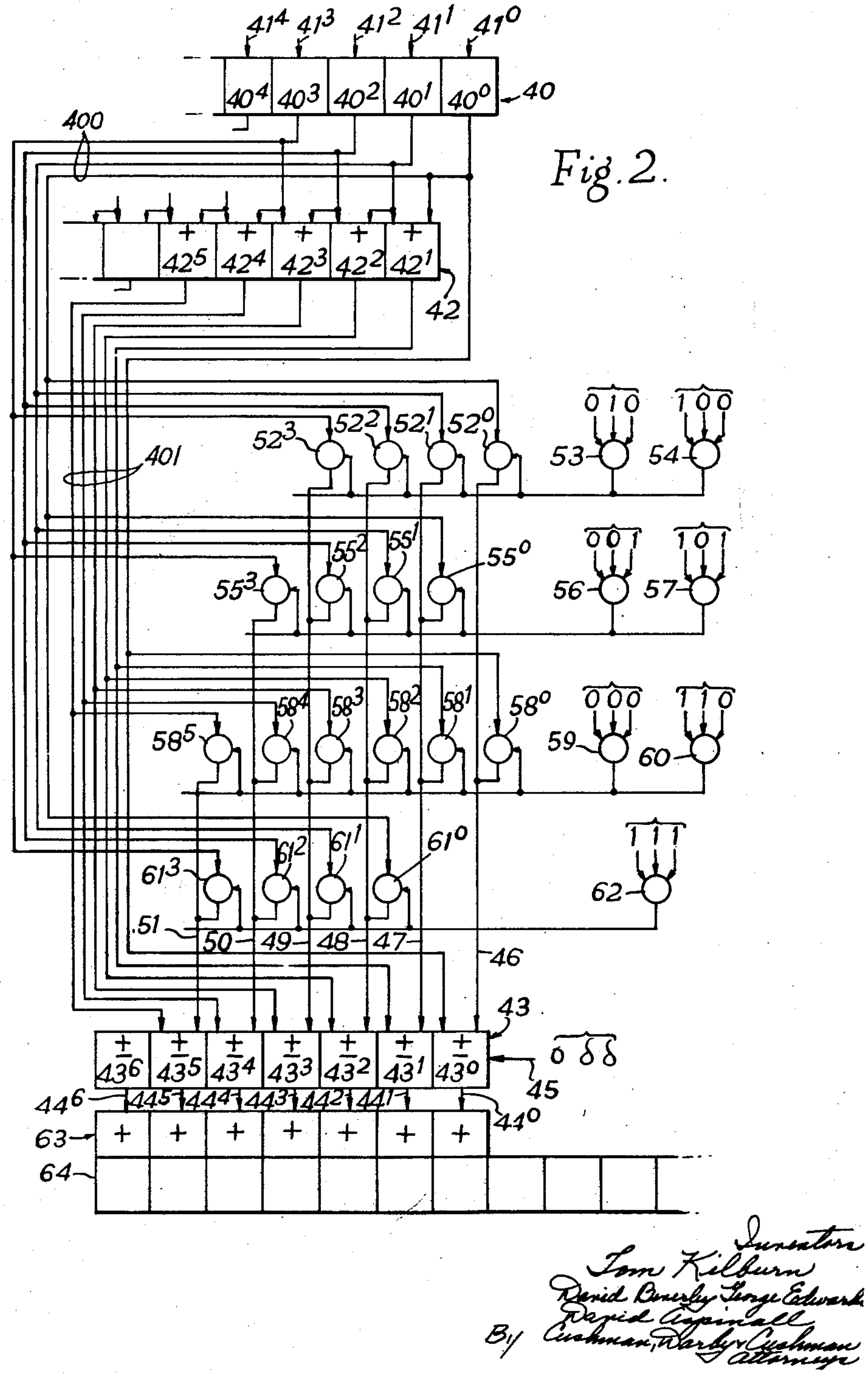
FIGURE 2 is a block schematic diagram of another arrangement, similar to FIGURE 1, but adapted for operation in the parallel mode.

The equivalent parallel mode arrangement of FIG. 2 is shown, for simplicity, as employing a binary multiplicand number of only four digits length but the manner of extension to deal with numbers of greater length will be self-evident.

In this embodiment, the multiplicand number signal $d$ is first registered in an appropriate multi-stage register 40 of any convenient known form, said register having successive stages such as toggle or flip-flop circuits $40^0$, $40^1$, $40^2$ and $40^3$ controlled respectively by input leads $41^0$, $41^1$, $41^2$ and $41^3$. The group of parallel output leads 400 carry the multiplicand multiple $d$. A second multi-stage register 42 serves to record the multiplicand multiple $3d$, this register including suitable adding and carry digit propagation circuits to permit its direct interconnection in the manner shown with the register 40 so that upon application of the parallel form multiplicand digit signals to the first register over the input leads $41^0$, $41^1$ . . . $41^3$, the multiplicand multiple $3d$ is automatically set up on the second register stages $42^1$, $42^2$ . . . $42^5$ in combination with the first stage $40^0$ of the first register which supplies the least significant digit of the multiple $3d$ also. The group of parallel output leads 401 carry the multiplicand multiple $3d$.

A convertible multi-stage parallel adding/subtracting device 43 of any suitable form already well known in the art has seven stages $43^0$, $43^1$ . . . $43^6$ and is signal-controlled over lead 45 in a manner similar to the series mode device 18 of FIG. 1, the device 43 being arranged to operate as an adder in the absence of a control signal on lead 45 but being convertible to cause subtraction when a control signal is applied to such lead 45. Such control signal is present only when the most significant digit of the examined three multiplier digit group is of value "0."

A series of coincidence or AND gates $52^0$, $52^1$, $52^2$, $52^3$, each controlled by the parallel outputs of coincidence gates 53 and 54, control the connection of the four separate output leads of the group 400 from the register 40 (representing the multiplicand multiple $d$) to one input of each of the first four stages $43^0$, $43^1$, $43^2$ and $43^3$ of the add/subtract device 43. A further series of coincidence or AND gates $55^0$, $55^1$, $55^2$ and $55^3$, each controlled by the paralleled outputs of coincidence gates 56, 57, likewise control the connection of the same four register output leads of the group 400 but to the four stages $43^1$, $43^2$, $43^3$ and $43^4$ of the add/subtract device 43 whereby the inputs to the latter are left shifted by one place so as effectively to provide the multiplicand multiple $2d$. Another similar series of coincidence gates $61^0$, $61^1$, $61^2$ and $61^3$, each controlled by the output of coincidence gate 62, control the connection of the output leads of group 400 from the same four stages of register 40 to the four stages $43^2$, $43^3$, $43^4$ and $43^5$ of the add/subtract device 43 whereby these inputs are left shifted by a further place so as effectively to provide the multiplicand multiple $4d$.

Another series of coincidence or AND gates $58^0$, $58^1$ . . . $58^5$, each controlled by the paralleled outputs of coincidence or AND gates 59 and 60, control the connection of the group of output leads 401 (representing multiplicand multiple $3d$) from the register stages $40^0$, $42^1$, $42^2$ . . . $42^5$ to the stages $43^0$, $43^1$, $43^2$ . . . $43^5$ of the add/substract device 43 while the respective leads of the same group 401 (representing the multiplicand multiple $3d$) are connected directly to the second inputs of each of the stages $43^0$, $43^1$, $43^2$ . . . $43^5$ of the add/subtract device 43.

The gates 53, 54, 56, 57, 59, 60 and 62 are analogous to the gates 25, 26 . . . 31 of FIG. 1, being controlled by the operative group of three staticised multiplier digits. The manner of operation will be apparent from the previous description of the series-mode embodiment of FIG. 1. Thus, if the currently operative group of three multiplier digits is 100 (decimal value 4) the gate 54 will be operated to provide an output which opens each of the gates $52^0$, $52^1$, $52^2$ and $52^3$. These connect the group of leads 400 (carrying the multiplicand multiple $d$) to one input of each of the stages $43^0$, $43^1$, $43^2$ and $43^3$ of the add/subtract device. The group of leads 401 (carrying the multiplicand multiple $3d$) is connected to the second inputs of the same stages $43^0$ . . . $43^3$ and the further stages $43^4$ and $43^5$ (to allow for the greater digit length of the multiple $3d$). Since the most significant digit of the multiplier digit group (100) is of value "1," the add/subtract device 43 is set to effect addition and as a result the parallel form partial product emerging on leads $44^0$ . . . $44^6$ is the correct partial product $3d+d=4d$.

The parallel output leads $44^0$, $44^1$ . . . $44^6$ of the adding/subtracting device 43 are connected respectively to one input of a series of further adding devices 63. The other input of such adding devices 63 is arranged to be supplied with a signal representing the current "0" or "1" state of the associated stage of the shifting register 64 while the output of each of such adding devices is arranged for use as a resetting signal for the same associated stage of the register 64. In the operation of such combined shifting and adding register any applied add input over leads $44^0$ . . . $44^6$ can be added to the already existing content of the register. The shifting register 64 forms part of the final product accumulating means. After each operation of sensing a three-digit group of the multiplier number signal and the resultant application of a selected multiplicand multiple to the adding/subtracting device 43 along with the constantly applied multiplicand multiple $3d$ and following the usual carry digit propagation in the latter, the signal state of the different stages $43^0$ . . . $43^6$ is transferred in known manner to the interconnected stages of the adding device 63 which are already influenced by the existing signal state of the accumulator register stages 64. These stages accordingly become altered to add in the presented new partial product. Thereafter the accumulator register 64 is caused to right shift by three digit places prior to the next operation cycle which takes place under the control of the next three digit group of the multiplier signal.

Each of the arrangements so far described requires an adding device, additional to the convertible adding/subtracting device employed for partial product formation, in order to add the partial product into the accumulating means. Adding devices are relatively complex and expensive and a saving of the accumulator adding device together with other major economies in the case of parallel mode arrangements may be made by arranging for the selection of the required multiplicand multiple and the add/subtract control of the convertible adding/subtracting device to be dependent not only upon the examined values of the operative three-digit group of the multiplier but also upon the examined value of the most significant digit of the previously operative three-digit group.

Figure 3:
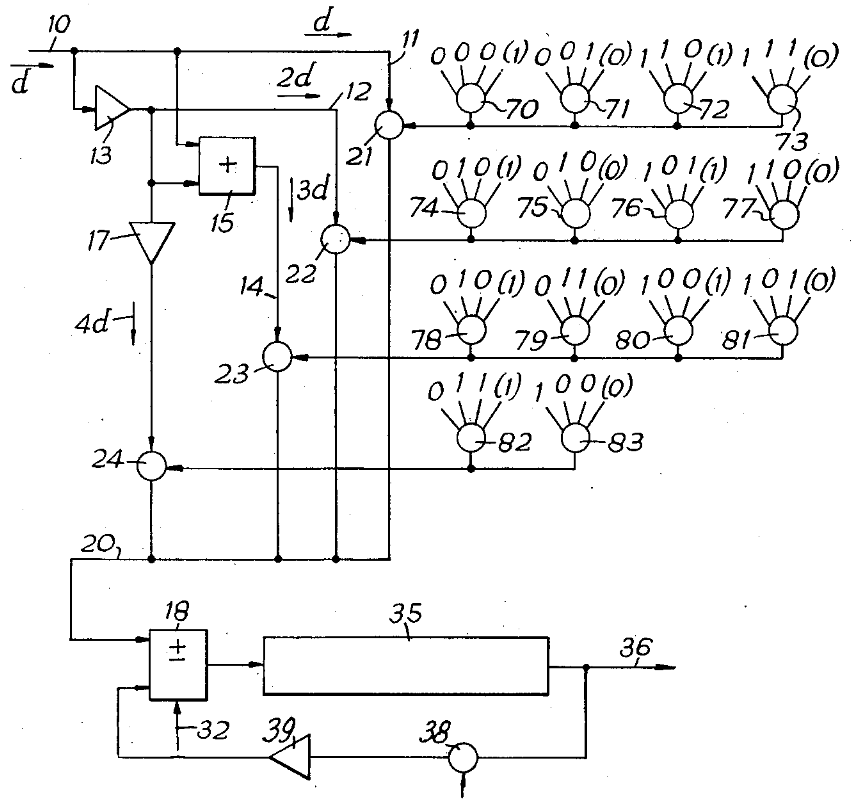

A serial mode arrangement of this second form of the invention is shown in FIG. 3 in which elements corresponding to those of FIG. 1 have been given similar reference characters. The control of the gate 21 governing the supply of the multiplicand multiple $d$ is now by the output of any one of four coincidence gates 70, 71, 72 and 73 controlled by the multiplier digit signals shown against each, the right hand bracketed value being that of the most significant digit of the previously operative three-digit multiplier group. The gate 22 governing the supply of the multiplicand multiple $2d$ is similarly controlled by the output from four further coincidence gates 74, 75, 76 and 77 each controlled by the multiplier digit signals as shown, while gate 23 which governs the supply of the multiplicand multiple $3d$ is controlled by the output of four coincidence gates 78, 79, 80 and 81 each controlled by the multiplier digit signals shown. The gate 24 which governs the supply of the multiplicand multiple $4d$ is controlled by the output from either of the coincidence gates 82, 83 controlled by the further multiplier digit signals shown thereagainst. The adding device 34 of FIG. 1 is eliminated, the regeneration loop circuit 37 around the register 35 being now returned to the second input of the convertible adding/subtracting device 18. The latter is now controlled by the value of the most significant digit of the operative three-digit multiplier group, control lead 32 being energised to cause the device 18 to subtract when such digit is of the value "1" and to add when such digit is of value "0."

Such an arrangement provides for multiplicand multiple selection and add/subtract control according to the following table:

| Operative multiplier digit values | Previous *m/s* digit value | Add/ Subtract | Multi- plicand multiple |
|---|---|---|---|
| 0 0 0 | 0 | + | 0 |
| 0 0 0 | 1 | + | *d* |
| 0 0 1 | 0 | + | *d* |
| 0 0 1 | 1 | + | 2*d* |
| 0 1 0 | 0 | + | 2*d* |
| 0 1 0 | 1 | + | 3*d* |
| 0 1 1 | 0 | + | 3*d* |
| 0 1 1 | 1 | + | 4*d* |
| 1 0 0 | 0 | — | 4*d* |
| 1 0 0 | 1 | — | 3*d* |
| 1 0 1 | 0 | — | 3*d* |
| 1 0 1 | 1 | — | 2*d* |
| 1 1 0 | 0 | — | 2*d* |
| 1 1 0 | 1 | — | *d* |
| 1 1 1 | 0 | — | *d* |
| 1 1 1 | 1 | — | 0 |

In the operation of this embodiment, at the first examination of the three least significant digits of the multiplier number signal the value of the (non-existent) previous most significant digit is assumed always to be value "0" while the number of operation cycles is increased by one to deal with the most significant digit of the multiplier number in its role of most significant "previous" digit. In this additional last operation cycle, the (non-existent) three multiplier digit group is assumed to be "000." The arrangements of the adder/subtractor device 18 include conventional means for extending the product output signal by copies of any carry over "1" digit beyond the most significant digit position of the input multiplicand signal.

The manner of operation will be made clear by the following numerical example using as multiplicand (D) the binary number 001100100 (decimal value 100) and as multiplier (R) the binary number 100101001 (decimal value 297).

| | | |
|---|---|---|
| 1st cycle | R digits 001(0) = +*d* = | 001100100 |
| | right shift 3 places | 001100100 |
| 2nd cycle | R digits 101(0) = −3*d* = | 0100101100 |
| | | 1111011100000100 |
| | right shift 3 places | 1111011100000100 |
| 3rd cycle | R digits 100(1) = −3*d* = | 0100101100 |
| | | 111101011000000100 |
| | right shift 3 places | 111101011000000100 |
| 4th cycle | R digits 000(1) = +*d* = | 001100100 |
| | | 000011101000000000100 |

giving as final product the binary number: 111010000000100 (decimal 29700)

Figure 4:
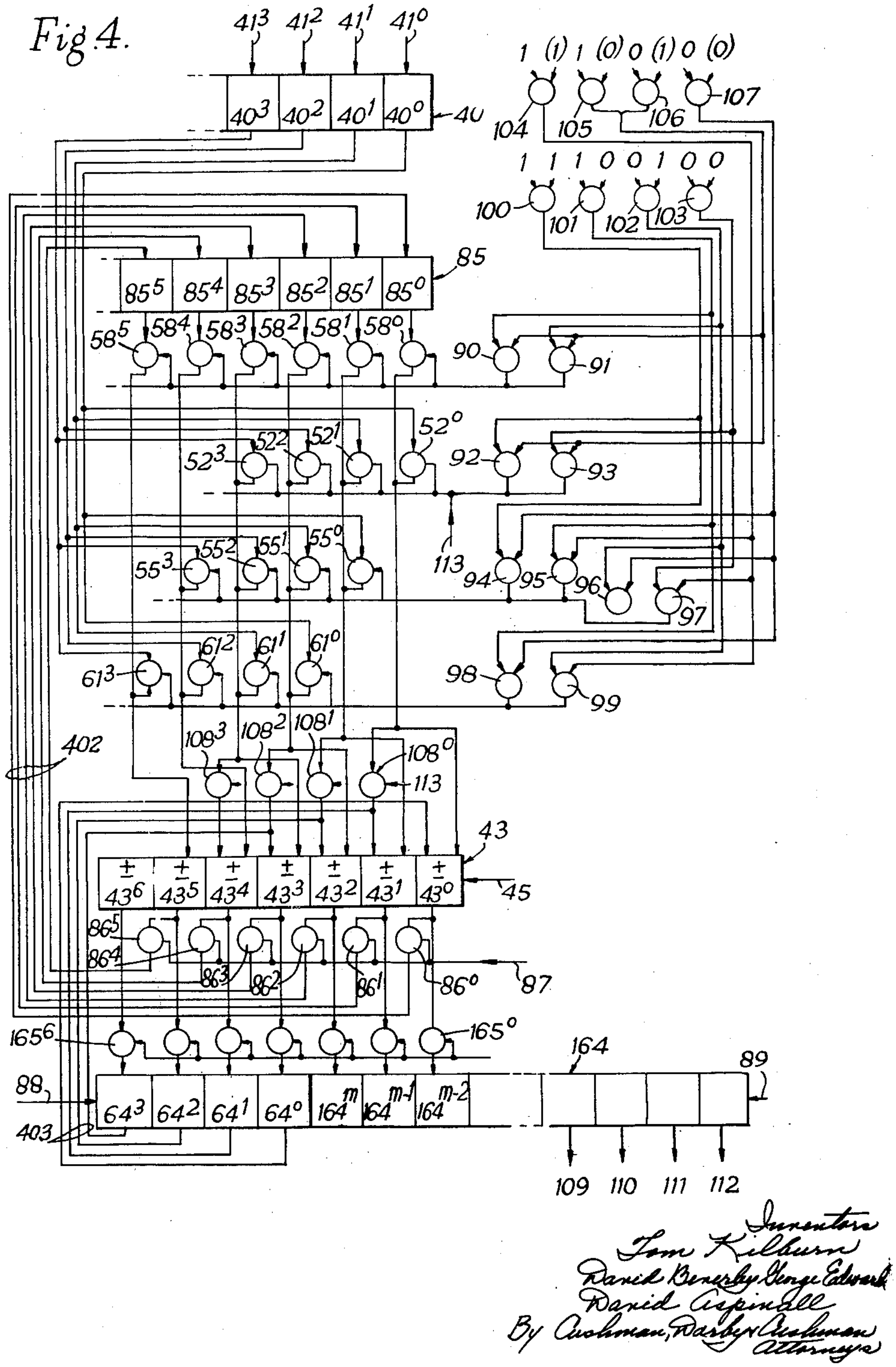
FIGURE 4 is a block schematic diagram of yet another arrangement, similar to FIGURE 3, but adapted for operation in the parallel mode.

An approximately equivalent parallel mode arrangement of this second form is shown in FIG. 4 where elements similar to those of FIG. 2 are also given similar reference characters. This arrangement also avoids the use of the further multi-stage adding device 42 of FIG. 2 by the provision instead of a simple multi-stage register 85 having stages $85^0$ . . . $85^5$ which are set up to register the multiplicand multiple 3*d* by an additional preliminary operation step in which the multiples *d* and 2*d* from the register 40 are fed to the convertible adding/subtracting device 43 by way of gates $52^0$ . . . $52^3$ and $108^0$ . . . $108^3$ respectively each opened by energisation of the respective control leads 113. The resultant 3*d* output signal from the device 43 is then fed back to the individual stages of the register 85 over the group of leads 402 by momentary opening of gates $86^0$ . . . $86^5$ by a control signal on lead 87.

At this time the series of gates $165^0$ . . . $165^6$ in the alternative output leads from the convertible adding/subtracting device 43 are held closed to prevent entry of this 3*d* multiple into the accumulator.

The group of gates $52^0$ . . . $53^3$ concerned with the provision of multiple *d* are controlled by gates 92, 93 which are controlled, in turn, by the four multiplier digit values through coincidence gates 100 . . . 103 which serve to sense the two most significant digits of the operative three-digit group and further coincidence gates 104 . . . 107 which serve to sense the least significant digit of such operative three-digit group and the most significant digit of the previously operative three-digit group. In similar manner, the group of gates $55^0$ . . . $55^3$ concerned with the provision of multiple 2*d* are controlled by coincidence gates 94, 95, 96 and 97 also controlled by the four multiplier digit values through gates 100 . . . 107. The group of conicidence gates $58^0$ . . . $58^5$ concerned with the provision of multiple 3*d* are controlled by coincidence gates 90, 91 likewise influenced by the four multiplier digit values while the group of coincidence gates $61^0$ . . . $61^3$ concerned with the provision of multiple 4*d* are controlled by the four multiplier digit values through coincidence gates 98, 99.

The adding/subtracting device 43 of this embodiment operates also as part of the accumulator by the connection of the outputs of the accumulator register stages $64^0$ . . . $64^3$ by way of the lead group 403 to the second inputs of the stages $43^0$ . . . $43^3$ of the convertible add/subtract device 43. The said accumulator register stages $64^0$ . . . $64^3$ are arranged to provide output signals indicative of the "1" or "0" state thereof for this purpose by application of a control or strobe pulse on lead 88. Such register stages $64^0$ . . . $64^3$ are also cleared to zero at the same time by this pulse. This lead 88 is activated either simultaneously with or after the application of the selected multiplicand multiple to the first inputs of the said stages $43^0$ . . . $43^5$. The accumulator register stages $64^0$ . . . $64^3$ at the most significant end of the accumulator 164 are not or need not be of the shifting register type but the remaining less significant stages $164^n$, $164^{n-1}$ . . . of the accumulator 164 are of such shift type and operate to effect right under the control of shift signals applied over control lead 89. The register stages $164^n$, $164^{n-1}$ . . . are right shifted by three digit places at the end of each operation step by a signal on lead 89. If desired such register, which must be of double word length, may also be used initially to register the multiplier number signal in its least significant half which is always empty at the commencement of a multiplying operation. The four least significant digit stages of the register may then correspond with the four digits used for control of multiplicand multiple selection and control of the add/subtract device 43. Outputs therefrom as shown at 109 . . . 112 are then used to provide the requisite control signals to the various gates 100 . . . 107 and to lead 45. Thus the outputs 109 and 110 provide signals corresponding to the two most significant digits of the three operative examined digits, the respective "1" value digit signals being obtained directly from such outputs and the opposite "0" value digit signals being obtained through inverter stages in conventional manner. Correspondingly, the outputs 111 and 112 provide signals indicating respectively the examined values of the least significant of the three operative multiplier digits and the previous most significant digit.

As with the serial mode embodiment of FIG. 3, the first operation step or cycle with the three least significant multiplier digits is made with the assumption of value "0" for the non-existent fourth digit while after effecting the necessary number of operation cycles to deal with all of the available multiplier digits, a final step or cycle is made with an assumed zero value (000) accorded to the non-existent operative digits of the multiplier in conjunction with the actual examined value of the most significant previous digit.

The manner of interconnection of stages $43^3$ . . . $43^6$ of the adding/subtracting device 43 to stages $64^0$ . . . $64^3$ of the non-shifting part of the accumulator effectively provides an automatic three-position right shift as the related partial product digits are loaded into the accumulator. The three-digit right shift of the remainder of the accumulator register including the stages $164^n$, $164^{n-1}$ and $164^{n-2}$ is arranged to take place as the digit values of stages $64^0$ . . . $64^3$ are fed to the adding/subtracting device 43 and such stages simultaneously cleared. All seven stages $164^{n-2}$, $164^{n-1}$ . . . $64^3$ are thus left empty in readiness for the arrival of the next partial product. The overall speed of multiplication is accordingly improved by overlapping of the adding (or subtracting) and the shifting times while the prior shifting of the least significant part of the accumulator register also allows decoding of the next group of multiplier digits which appear automatically in the opposite end stages of the register 164 to be overlapped with the preceding add/subtract operation.

The multiplying apparatus elements shown may also be largely employed in an associated dividing arrangement which operates to determine the quotient digits in turn singly but with right shifting of the divisor only once every three division steps and then by three places. To effect this, advantage is taken of the facility of providing the different multiples *r*, 2*r* and 4*r* of the division number by means of the apparatus used for forming *d*, 2*d* and 4*d* during multiplication. In such division, 4*r* is first subtracted and the sign of the remainder tested. If this is positive, "1" is placed in the quotient register and 2*r* then selected and subtracted also. If, however, the sign is negative, "0" is placed in the quotient register and the selected 2*r* is added. In either case, the sign of the remainder is again tested and the operation repeated with *r* before shifting the remainder by three places.

It will be apparent that the invention is not limited to the particular arrangements as shown and described. The number of digits in each multiplier digit group may be greater or smaller than three while instead of choosing 3*d* as the constant input to the adding/subtracting device in the first form described, another value, e.g. 4*d*, may be employed with appropriate modification of the multiplicand multiple selection and adding/subtracting device control.

We claim:

1. A multiplying arrangement of the kind described for numbers represented by electric signals which comprises a signal-controlled arithmetic device which can be caused to effect either addition or subtraction of two number signals applied thereto in dependence upon a controlling signal, means for providing a number of separate signals representing respectively different successive multiples of the multiplicand number from the first multiple up to at least half the total number of multiples capable of being signalled by the chosen number of digits forming each separately examined digit group in the multiplier number and means for effecting the selection, in accordance with the examined values of each of said multiplier digit signal groups in turn, of an appropriate one of said multiplicand-multiple representing signals for application as one signal input to said arithmetic device and the simultaneous signal control of such device by the same group of multiplier digit signals whereby such arithmetic device causes either addition or substraction of the selected multiplicand-multiple representing signal to or from a chosen one of said multiplicand representing signals applied to the other input of said arithmetic device.

2. A multiplying arrangement according to claim 1 in which said number signal applied to the other input of said arithmetic device is that one of said multiplicand-multiple representing signals which represents a multiple lying sustantially mid-way of the total range of multiples which can be signalled by the chosen number of multiplier digits in each examined group and in which the selected multiplicand multiple and the add/subtract control of said arithmetic device is such that the signal output from said arithmetic device represents the correct partial product called for by the examined group of multiplier digits.

3. A multiplying arrangement according to claim 2 which includes an accumulating device to which said partial product representing signal is applied and by which it is combined with any previously obtained partial product representing signals so as to form an eventual signal representing the final product of said multiplicand and multiplier numbers.

4. A multipling arrangement for binary number signals according to claim 1 in which each examined group of multiplier digits consists of three sequential digits and in which signals representing the multiplicand multiples *d*, 2*d*, 3*d* and 4*d* are made available for selection.

5. A multiplying arrangement for binary number signals according to claim 4 in which said other input of said arithmetic device is supplied with the signal representing the multiplicand multiple 3*d*.

6. A multiplying arrangement according to claim 5 arranged for operation in in the parallel mode, in which said accumulating device comprises a multi-stage shifting register and which includes means for sensing the digit value state of a predetermined number of the least significant stages of said shifting register to provide means for examining the values of the successive multiplier digit groups by initial registration of said multiplier number signal therein.

7. A multiplying arrangement of the kind described for numbers represented by electric signals which comprises an accumulating device including a signal register and a signal-controlled arithmetic device which can be caused to effect either addition or subtraction of two number signals applied to first and second signal inputs thereof in dependance upon a controlling signal, means for providing a number of separate signals representing respectively different successive multiples of the multiplicand number from the first multiple up to at least half the total number of multiples capable of being signalled by the chosen number of digits forming each separately examined digit group in the multiplier number and means for effecting the selection in turn, in accordance with the examined values of each of said multiplier digit signal groups and the value of the most signfiicant digit of the previously examined multiplier digit groups, of an appropriate one of said multiplicand-multiple representing signals for application as the signal input to the first input of said arithmetic device and the simultaneous signal control of such device by the same examined signal values to cause such arithmetic device to effect either addition or subtraction of such applied multiplicand-multiple representing signal to or from a number signal from said register representing the previously accumulated partial product number which is applied to the second input of said arithmetic device.

8. A multiplying arrangement for binary number signals according to claim 7 in which each examined group of multiplier digits consists of three sequential digits and in which signals representing the multiplicand multiples *d*, 2*d*, 3*d* and 4*d* are made available for selection.

9. A multiplying arrangement according to claim 7 arranged for operation in the parallel mode, in which said accumulating device comprises a multi-stage shifting register and which includes means for sensing the digit value state of a predetermined number of the least significant stages of said shifting register to provide means for examining the values of the successive multiplier digit groups by initial registration of said multiplier number signal therein.

10. A multiplying arrangement of the kind described for binary numbers represented by electric signals which comprises a first source of signals representing the multiplicand number, a second source of signals representing the respective digit values of each of a plurality of multidigit groups of the multiplier number in turn, means connected to said first source of signals for providing a plurality of separate electric signals representing respectively a number of different multiples of the multiplicand number represented by the signals from said first source, said number of multiples being less than the number capable of being represented by any one of said multiplier digit groups, a plurality of multiplicand-multiple signal sources connected to said multiple-signal providing means and each supplying a different one of said multiplicand-multiple representing signals, a signal-controlled arithmetic device which includes first and second signal inputs, a signal output and a control signal input and which can be caused to effect either addition or subtraction of number-representing signals applied respectively to said first and second signal inputs in accordance with the form of the control signal at said control signal input, circuit means supplying signals representing a predetermined multiple of said multiplicand to said second input of said arithmetic device, further circuit means including individual signal controlled gate means connecting each of said multiplicand-multiple signal sources to said first input of said arithmetic device and means providing control signals to each of said gate means and said control signal input of said arithmetic device from said second source of signals.

References Cited in the file of this patent

UNITED STATES PATENTS 2,856,126 Kilburn ---------------- Oct. 14, 1958

FOREIGN PATENTS 810,656 Great Britain ------------ Mar. 18, 1959

OTHER REFERENCES

Synthesis of Electronic Computing and Control Circuits by The Staff of the Computation Laboratory, Harvard University Press, 1951, (pp. 197 to 204 relied on).